Figure 1:
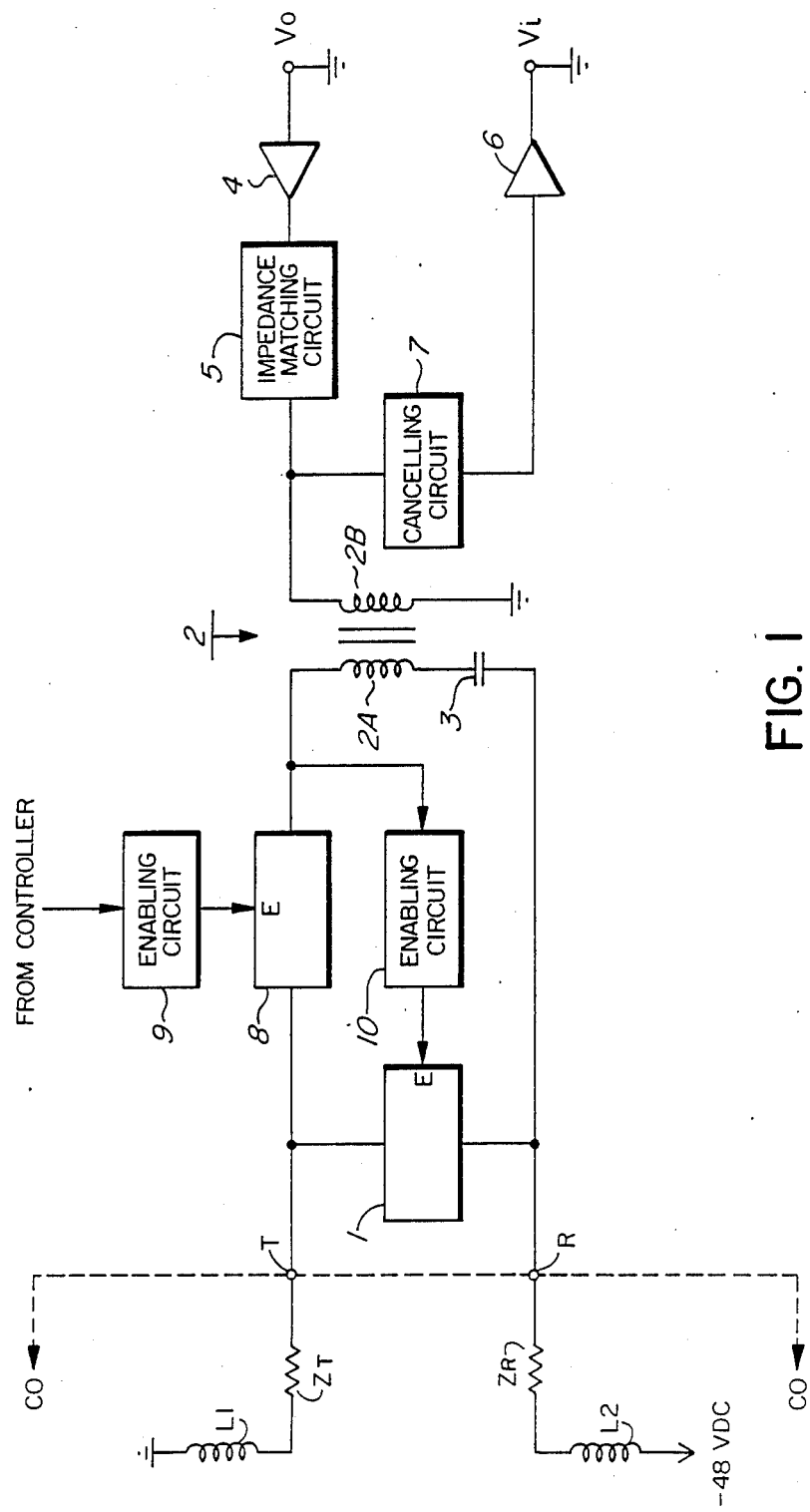

United States Patent [19]

Styrna et al.

[11] Patent Number: 4,776,007
[45] Date of Patent: Oct. 4, 1988

[54] SOLID STATE TRUNK CIRCUIT

[75] Inventors: Zbigniew B. Styrna, Kanata; Douglas C. Oddy, Ottawa, both of Canada

[73] Assignee: Mitel Corp., Ontario, Canada

[21] Appl. No.: 865,961

[22] Filed: May 22, 1986

[30] Foreign Application Priority Data

Nov. 20, 1985 [CA] Canada .................................... 495810

[51] Int. Cl.⁴ .............................................. H04M 7/10
[52] U.S. Cl. .................................... 379/234; 379/413; 379/398; 379/324
[58] Field of Search ............... 379/234, 324, 240, 413, 379/380, 345, 398, 399, 400, 402

[56] References Cited

U.S. PATENT DOCUMENTS 4,074,087  2/1978  Bluke, Jr. et al. ............... 379/410 X
4,126,765  11/1978  Calder et al. .................... 379/380 X

FOREIGN PATENT DOCUMENTS 1562934  3/1980  United Kingdom .
2071461  9/1981  United Kingdom .

Primary Examiner—James L. Dwyer
Attorney, Agent, or Firm—Antonelli, Terry & Wands

[57] ABSTRACT

A trunk circuit is disclosed for coupling a bidirectional lead pair, such as balanced tip and ring leads, to a pair of unidirectional leads such as unbalanced input and output leads. The trunk circuit incorporates a small inexpensive transformer for effecting this coupling and for providing large common mode signal isolation and correct longitudinal balance. Circuitry is provided for matching the nominal balanced AC and DC line impedances. The trunk circuit also provides circuitry for generating dial pulse signals under control of a microprocessor or other external controller.

14 Claims, 2 Drawing Sheets

SOLID STATE TRUNK CIRCUIT

This invention relates in general to telephone systems, and more particularly to a trunk circuit for coupling a bidirectional lead pair, such as balanced tip and ring leads, to a pair of unidirectional leads such as unbalanced input and output leads connected to a PABX.

A trunk comprised of balanced tip and ring leads is typically connected to a central office switching system, and exhibits a nominal line impedance, standardized in North America at 600 ohms. The tip and ring leads are required to carry signals bidirectionally between the central office and a private exchange or PABX. Because various internal circuits of central offices and PABXs often exhibit different characteristic impedances, trunk circuits are often required to effect various impedance matching conversions. Trunk circuits must also provide a low resistance to D.C. feed currents, which has been standardized at under 250 ohms.

Due to the large number of trunks exposed to weather and other environmental factors such as high voltage power lines, poor or changing ground resistance etc., large common mode signals sometimes appear on the trunks. These signals may reach amplitudes in excess of ±100 volts A.C. Trunk circuits are required to protect internal circuits of the PABX against such large common mode signals.

While the tip and ring leads are normally electrically balanced, A.C. audio signals thereon are inherently differential in nature. Thus a trunk circuit is required to bidirectionally couple the audio signals between the PABX or central office and the trunk in a differential, isolated manner. The trunk circuit is also required to remove large common mode signals appearing on the tip and ring leads, present an A.C. impedance to the tip and ring leads which matches the nominal line impedance, and present a resistance to D.C. feed currents which matches the standardized D.C. feed current resistance.

In addition, trunk circuits are also often required to generate dial pulse signals under control of a microprocessor or other external controller.

Prior art trunk circuits have previously incorporated large hybrid transformers requiring a precise number of windings and considerable shielding, to provide correct impedance matching. Such prior art hybrid transformers typically exhibit a large rated isolation voltage between primary and secondary coils thereof, and provide good common mode signal isolation. However, with the advent of electronic switching offices and PABXs of considerably reduced size and weight, the use of such transformers is considered an impediment to miniaturization. For example, where the circuitry of a PABX is disposed on printed circuit boards built into a small console unit, such transformers add bulk, weight and unacceptable size to the unit. The bulk of the transformers is due to inclusion of a large size core, in order that it should not saturate in the presence of large D.C. feed currents. The requirement of having a precise number of turns on the windings, in order to effect the proper matching impedance, adds to the cost of the unit.

A variation of the aforementioned prior art hybrid transformer trunk circuit incorporates a center tapped secondary coil to which additional impedance matching circuitry is connected, typically in the form of a bridge circuit. While this variation allows for somewhat simpler adjustment of the matching impedance over the first mentioned circuit, the cost of the center tapped impedance circuitry and large core transformer is comparably expensive.

Other prior art trunk circuits have previously been used which incorporate solid state devices instead of large hybrid transformers. Canadian Pat. Nos. 1,123,131 and 1,142,281 issued May 4, 1982 and Mar. 1, 1983 respectively, to Mitel Corporation, and entitled TRANSFORMERLESS TRUNK CIRCUIT, describe such solid state trunk circuits. According to Mitel Pat. No. 1,123,131, a first trunk circuit is disclosed in which impedance matching circuitry is connected in series with tip and ring terminals connected to the tip and ring leads, and in parallel with a high impedance circuit for passing D.C. feed current between the tip and ring terminals. A differential amplifier is connected to the tip and ring terminals for receiving A.C. signals carried by the tip and ring leads. A resistor and capacitor series combination is connected to each of the inverting and non-inverting inputs of the differential amplifier in order to block D.C. current from being received by the amplifier. Outgoing signals are optically coupled from an unbalanced junctor terminal of the PABX to a control input of the aforementioned high impedance circuit. The high impedance circuit functions as a D.C. signal source for modulating the D.C. current passing therethrough in response to receiving the outgoing signals on the control input thereof.

The prior art Mitel device entirely eliminates the necessity of a large core hybrid transformer, thereby overcoming the prior art disadvantages associated with such transformers. However, the resistor and capacitor series combination connected to the inputs of the differential amplifier are required to be carefully matched, in order to ensure good longitudinal balance. Longitudinal balance is a measure of how closely the impedances from the tip lead to ground and the ring lead to ground are matched. Unless the input resistors and D.C. blocking capacitors are matched to within approximately 1%, common mode signals appearing on the tip and ring leads will be differentially received by the differential amplifier, amplified therein and applied to the PABX. Such close matching is expensive, since it frequently requires testing and sorting capacitors by hand to ensure that the capacitors are matched to within the approximately 1% tolerance. Also, there is no protection against common mode signals in excess of the rated voltage of the blocking capacitors, typically 250 volts. The prior art Mitel solid state trunk circuit suffers from the further disadvantage that, in some circumstances the differential amplifier can receive, demodulate and transmit radio frequency signals to voice channel circuits of the PABX, which can interfere with telephone conversations.

A second modified trunk circuit is disclosed in Mitel Pat. No. 1,142,281 wherein the aforementioned optical coupling is replaced by an inexpensive small core transformer. The transformer couples outgoing signals between the unbalanced junctor terminal and the control input of the high impedance circuit, and a capacitor is placed in series with a secondary coil of the transformer in order to block direct current from passing therethrough. The modified Mitel trunk circuit suffers from the same disadvantages as the first described Mitel circuit, since a differential amplifier is still utilized for receiving incoming signals from the tip and ring leads, requiring carefully matched D.C. blocking input capacitors and resistors.

An essential characteristic of prior art solid state trunk circuits such as those described in the above mentioned Mitel patents is that two unidirectional signal paths are required in order to pass incoming signals from the tip and ring leads to the junctor terminal, and outgoing signals from the junctor terminal to the tip and ring leads.

It was realized however, that the differential amplifier employed in the prior art circuits could be eliminated and a small core transformer could be utilized to provide bidirectional signal translation between the tip and ring leads and unbalanced input and output leads (or an unbalanced junctor terminal), by connecting a primary coil of the transformer directly across the tip and ring terminals, as opposed to being connected to a control input of the high impedance D.C. current passing circuit, as taught by Mitel Pat. No. 1,142,281. It was further realized that A.C. impedance matching circuitry could then be connected to the secondary coil of the transformer, such that the matching impedance is reflected across the transformer. A high impedance D.C. current passing circuit could then be connected to the tip and ring terminals for passing D.C. feed current therebetween. It was not previously considered in the prior art to connect a small core transformer directly across the tip and ring leads while utilizing a D.C. current passing circuit for passing D.C. current between the tip and ring leads, since the primary coil according to the prior art, would be in parallel with the impedance matching circuitry and would act as a dynamic load tending to vary the effective A.C. impedance of the trunk circuit to A.C. signal currents of various frequencies, resulting in incorrect impedance matching.

It is for this reason that, in the prior art modified Mitel circuit, the transformer was connected to the high impedance D.C. current passing circuit, thereby necessitating an additional unidirectional signal path incorporating a differential amplifier, for receiving incoming signals from the tip and ring leads.

Thus, according to the present invention, a small core transformer is connected across tip and ring terminals connected to the tip and ring leads, for effecting a bidirectional signal translation path, and impedance matching circuitry is connected to a secondary coil of the transformer, as opposed to being connected directly across the tip and ring leads, as in the prior art.

The present invention fulfills the requirements of a trunk circuit noted above and overcomes the above mentioned disadvantages of prior art hybrid and solid state trunk circuits. Whereas prior art hybrid transformers required large cores in order that they do not saturate in the presence of large direct currents, the present invention utilizes a solid state high impedance circuit for passing direct current. Also, whereas the prior art modified Mitel circuit utilized a transformer for coupling outgoing signals to a control input of the high impedance circuit for modulating D.C. current passing therethrough, and a differential amplifier for receiving incoming signals, the present invention utilizes a small core transformer for bidirectionally translating signals.

The transformer of the present invention provides greater common mode signal isolation and better longitudinal balance than is provided by prior art solid state trunk circuits. The rated voltage of the transformer is typically greater than 500 volts, as opposed to the 250 volt rating typical of prior art D.C. blocking capacitors. As mentioned above, transformers exhibit inherently good common mode isolation, thus the use of a transformer in the present invention alleviates the requirement of prior art solid state trunk circuits for expensive, carefully matched input resistors and capacitors. The invention utilizes circuitry for substantially blocking D.C. current from passing through the transformer and for providing a low resistance D.C. feed current path between the tip and ring leads. The transformer core is therefore not required to carry large D.C. feed currents and can be made small, thus overcoming the size and cost disadvantage of prior art hybrid transformers.

Prior art trunk circuits frequently employed relays and mechanical moving parts to perform dial pulsing. Mechanical and electro-mechanical dial pulsing circuits are inherently prone to mechanical failure due to fused coils, spring fatigue, etc. The present invention incorporates solid state dial pulsing circuitry having high reliability and accuracy, thereby eliminating the prior art requirement for mechanical moving parts.

The present invention is characterized by the advantages of having large common mode signal isolation and good longitudinal balance, yet it is small, inexpensive and lightweight, thus conforming to the miniaturization and cost reduction requirements of modern day PABX circuits.

According to the present invention in its most general form, there is provided a trunk circuit for connection to a balanced lead pair and to unbalanced unidirectional input and output leads, comprising circuitry for passing direct current between respective leads of the balanced lead pair, asmall core transformer for bidirectionally coupling incoming and outgoing A.C. signals between the balanced lead pair and the unbalanced input and output leads respectively, circuitry for substantially blocking direct current from passing through the transformer, and circuitry for preventing the outgoing signals from being applied to the unbalanced input lead. The transformer core is protected from saturation, and consequently can be made small as a result of the direct current being blocked from passing therethrough.

More particularly, the invention is a trunk circuit for connection to a central office through balanced tip and ring leads, and to unidirectional unbalanced input and output leads, comprised of tip and ring terminals for connection to the balanced tip and ring leads, for carrying a modulated D.C. signal comprised of incoming and outgoing A.C. signals superimposed on a D.C. current, a first circuit path for passing the D.C. current between the tip and ring terminals and substantially impeding passage of the A.C. signals therebetween, and input and output terminals for connection to the unbalanced input and output leads, for carrying the incoming and outgoing A.C. signals, respectively. The invention is further comprised of a small core transformer having a primary coil thereof connected in a circuit to the tip and ring terminals and a secondary coil thereof connected in a circuit to the input and output terminals and ground, for bidirectionally translating the incoming and outgoing A.C. signals between the tip and ring terminals and the input and output terminals respectively. The trunk circuit is additionally comprised of circuitry for blocking the D.C. current from passing through the transformer, and a cancelling circuit for preventing the outgoing signals carried by the output terminal from being applied to the input terminal.

The invention is also a method for bidirectionally translating signals between a balanced lead pair and unbalanced unidirectional input and output leads, comprising the steps of passing direct current between respective leads of the balanced lead pair, bidirectionally coupling incoming and outgoing A.C. signals between the balanced lead pair and the unbalanced input and output leads through a small core transformer, blocking direct current from passing through the transformer, and preventing the outgoing signals from being applied to the unbalanced input lead.

Figure 2:
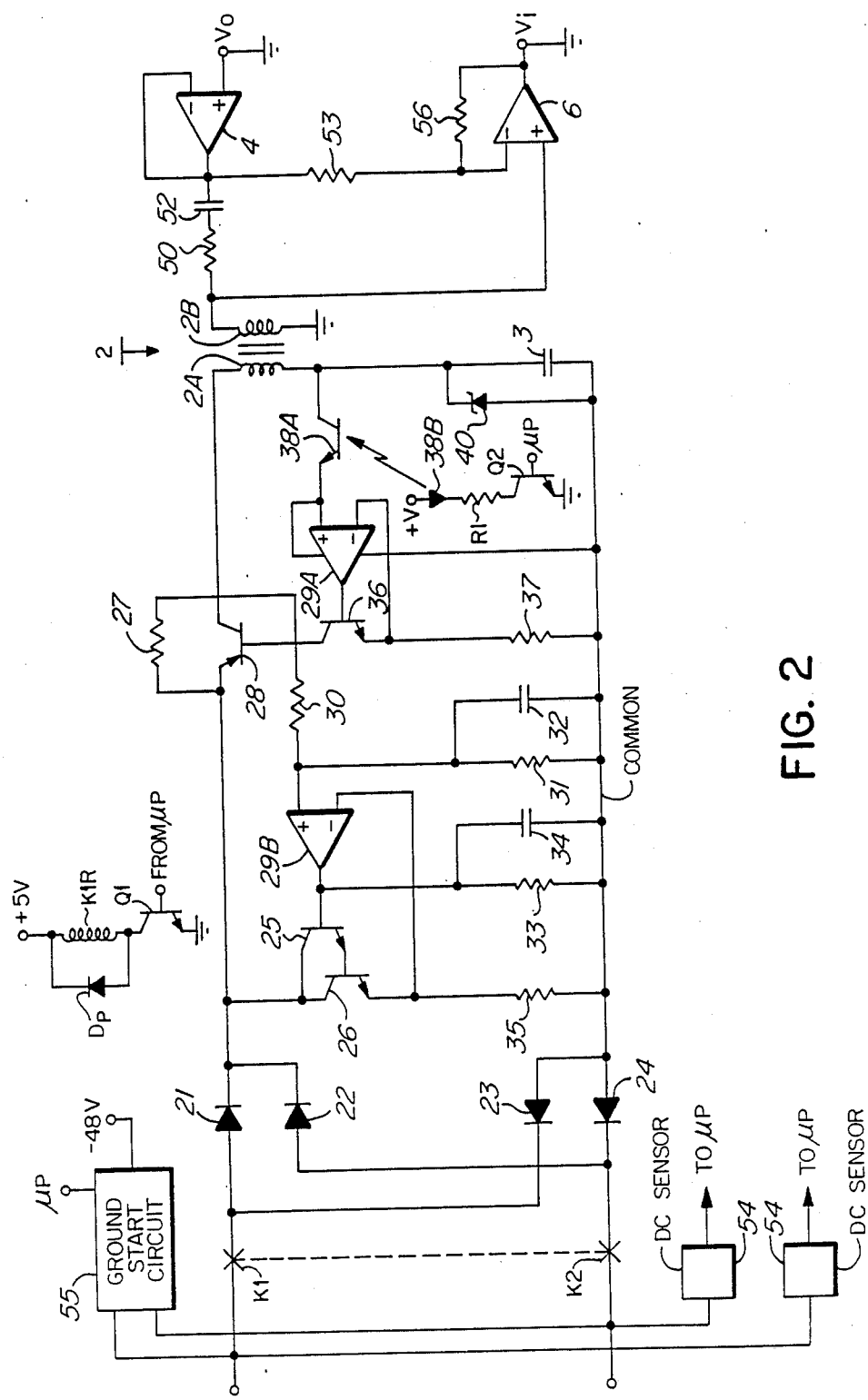

A better understanding of the invention will be obtained by reference to the detailed description below and to the following drawings in which:

FIG. 1 is a block schematic of the principal functional elements of the invention in its most general form, and FIG. 2 is a schematic diagram of a preferred embodiment of the invention.

Turning first to FIG. 1, a central office is indicated to the left of the dashed line, CO—CO, and is connected to tip and ring terminals T and R, of the trunk circuit. A source of −48 volts D.C. potential, located at the central office, provides operating battery to the trunk circuit through central office line inductances L1 and L2 and a pair of tip and ring leads. $Z_T$ and $Z_R$ represent individual nominal tip and ring lead impedances from the central office to the point at which the present invention is to be connected, although they may be provided fully or partly as individual resistors within the central office to establish the nominal impedances.

The above described circuitry does not form part of the invention, but is the environment in which the invention normally operates.

Direct current is received from the central office source of D.C. potential by the tip and ring terminals, T and R, and passes through a first circuit 1. Circuit 1 provides a low resistance path to direct current and a high impedance to alternating current, thus effectively impeding the passage of A.C. signals therethrough.

Input and output terminals $V_i$ and $V_o$ (the input and output designations being relative to the PABX), are connected to unbalanced unidirectional input and output leads connected to the PABX.

A transformer 2 is provided for bidirectionally coupling A.C. voltage signals between the tip and ring terminals, T and R, and the unbalanced input and output leads via the terminals $V_i$ and $V_o$. Incoming A.C. signals received from the central office and carried by the tip and ring terminals, T and R, are impressed across the series combination of a primary coil 2A of transformer 2 and a capacitor 3, which combination blocks D.C. current from passing therethrough. Capacitor 3 is required to be large in order that it does not present a large A.C. impedance to low frequency signals. A secondary coil 2B of transformer 2 is connected to ground and in a circuit to the input and output terminals $V_i$ and $V_o$.

A first amplifier circuit 4 is provided for amplifying and applying outgoing A.C. signals received from the output terminal $V_o$ to the secondary coil 2B via an impedance matching circuit 5. As discussed above, the balanced tip and ring leads exhibit a nominal line impedance, standardized in North America at 600 ohms. Hence, impedance matching circuit 5, in combination with transformer 2, provides a 600 ohm matching impedance, as described in greater detail below with reference to FIG. 2. A second amplifier circuit 6 receives incoming A.C. signals from the tip and ring terminals which had been impressed across the secondary coil 2B, and applies the received signals to the unbalanced input terminal $V_i$.

A cancelling circuit 7 substantially cancels A.C. signals received from the PABX, via output terminal $V_o$ from being reapplied to the PABX via second amplifier circuit 6, yet passes the incoming A.C. signals from the tip and ring terminals, T and R, to the second amplifier circuit 6, for transmission to the PABX.

A second circuit 8 is connected in series with the primary coil 2A and the tip and ring terminals, T and R. A first enabling circuit 9 is provided for enabling circuit 8 in response to receiving a control signal, which is typically an external control signal generated by a microprocessor or other controller.

A second enabling circuit 10, connected to an enable input E of circuit 1, is provided for enabling circuit 1 in response to the second circuit 8 being enabled.

In operation, A.C. voltage signals originating from the central office are applied to the tip and ring terminals, T and R, of the trunk circuit. These signals correspond to audio, speech or data signals and are superimposed on the −48 volt D.C. potential supplied by the central office. The superimposition of the A.C. signals on the D.C. potential results in a modulated D.C. signal.

Enabling circuit 9 applies an enable signal to circuit 8 in response to receiving the control signal from the external controller. Circuit 8 is thus enabled and completes an A.C. circuit path between the tip and ring terminals, T and R, through primary coil 2A and capacitor 3. Enabling circuit 10 generates a second enable signal in response to circuit 8 being enabled, thereby enabling circuit 1 and completing a D.C. current path from the tip terminal T, to the ring terminal R, through circuit 1, the D.C. current drawn thus signalling the central office that the trunk has been seized.

Switching circuit 1 exhibits a high impedance to A.C. signals, thereby substantially impeding such signals carried by the trunk from passing between the tip and ring leads through circuit 1. The A.C. signals are impressed across primary coil 2A and coupled to the secondary coil 2B. These signals are subsequently amplified by amplifier 6 and applied to the input lead of the PABX through input terminal $V_i$.

Outgoing signals from the PABX, appearing on the output terminal $V_o$, are applied to amplifier circuit 4 and therefrom to cancelling circuit 7 and secondary coil 2B. Cancelling circuit 7 blocks outgoing signals from being fed back to the PABX through amplifier circuit 6 but passes incoming signals from the tip and ring leads, T and R, induced in secondary coil 2B. The outgoing signals are coupled to primary coil 2A, and are superimposed on the D.C. potential appearing across the tip and ring terminals, T and R. The resultant outgoing signals are applied to the tip and ring leads as modulated D.C. signals.

Hence, the trunk circuit of the present invention provides for bidirectional signal translation across a small core, inexpensive transformer 2, thereby eliminating the prior art requirements of either a large core transformer or a differential amplifier having carefully matched D.C. blocking capacitors and high valued input resistors.

Turning now to FIG. 2, illustrating a detailed schematic diagram of a preferred embodiment of the invention, the tip and ring terminals, T and R, are connected through ganged relay contacts K1 and K2 respectively, to a bridge rectifier comprised of diodes 21, 22, 23 and 24. The anode of diode 21 is connected to the tip terminal T, with the cathode of diode 23, the anode of which is connected to the anode of diode 24 and a circuit common. The cathode of diode 24 is connected to the ring terminal R, with the anode of diode 22, the cathode of which is connected to the cathode of diode 21.

The cathodes of diodes 21 and 22 are connected to collector terminals of NPN transistors 25 and 26 (connected as a Darlington pair), and to a node connecting resistor 27 and the emitter terminal of a PNP transistor 28.

A second node connects resistor 27 to the collector terminal of transistor 28 and one terminal of primary coil 2A of the transformer 2. The non-inverting input of an operational amplifier 29B is connected in a circuit to the second node through a resistor 30. The non-inverting input of operational amplifier 29B is also connected to the circuit common through a parallel combination of a resistor 31 and a capacitor 32. The output of operational amplifier 29B is connected to the base terminal of transistor 25 and in a circuit to the common through a parallel combination of a resistor 33 and a capacitor 34.

The emitter terminal of transistor 25 is connected to the base terminal of transistor 26 in a well known manner to form the aforementioned Darlington transistor pair. The emitter terminal of transistor 26 is connected to the inverting input of operational amplifier 29B and in a circuit to the common through resistor 35.

The base terminal of transistor 28 is connected to the collector terminal of an NPN transistor 36, an emitter terminal of which is connected to the inverting input of an operational amplifier 29A, and to the circuit common through a resistor 37.

Operational amplifiers 29A and 29B are preferably fabricated on a single integrated circuit, such as a dual operational amplifier.

An output of operational amplifier 29A is connected to the base terminal of transistor 36. The non-inverting input of operational amplifier 29A is connected to a power supply input thereof and to the emitter terminal of a phototransistor 38A which, in conjunction with a light emitting diode 38B, forms an optocoupler. The ground terminal of operational amplifier 29A is connected to the circuit common. The collector terminal of phototransistor 38A is connected to the other terminal of primary coil 2A (of transformer 2) and to capacitor 3, the latter having a large value of capacitance.

A zener diode 40 is connected between the collector terminal of phototransistor 38A and the circuit common in a well known manner for providing protection of the power and non-inverting inputs of the dual operational amplifier 29A and 29B against potentially damaging high voltage levels which may appear across capacitor 3.

The anode of light emitting diode 38B is connected to a source of positive voltage +V, and the cathode thereof is connected in a circuit to the collector terminal of an NPN transistor Q2 through a resistor R1. The emitter terminal of transistor Q2 is connected to ground and the base terminal thereof is connected to a microprocessor, $\mu P$, for generating the control signal discussed above with reference to FIG. 1.

Transistor Q2 turns on in response to the first control signal being generated by the microprocessor $\mu P$, and applied to the base terminal of transistor Q2 such that a current path is established between the source of positive voltage +V and ground through light emitting diode 38B, resistor R1 and the collector-emitter junction of transistor Q2. A PN junction of diode 38B emits light in response to becoming forward biased, thus illuminating the light sensitive region of phototransistor 38A and forward biasing the base-emitter junction thereof such that phototransistor 38A turns on.

Secondary coil 2B of transformer 2 is connected between ground a resistor 50. Resistor 50 is connected in series with a capacitor 52 which comprise the impedance matching circuit 5 referred to above with respect to FIG. 1, and is further connected to the output of buffer amplifier 4. Capacitor 52 ensures that no direct current passes from amplifier 4 through the secondary coil 2B of transformer 2. The output of amplifier 4 is connected to the inverting input thereof and to the inverting input of buffer amplifier 6 through a resistor 53. The inverting input of buffer amplifier 6 is also connected to its output through a feedback resistor 56, the output thereof being connected to the unbalanced input terminal $V_i$ for connection to the PABX. The unbalanced output terminal $V_o$ is connected to the non-inverting input of amplifier 4. The non-inverting input of amplifier 6 is connected in a circuit to secondary coil 2B.

The balanced tip and ring terminals, T and R, are also connected to status sensors 54 and a ground start circuit 55. Sensors 54 are provided for detecting seizure of the trunk and ringing signals, and for providing other line status information signals to the microprocessor, $\mu P$.

The ground start circuit 55, in conjunction with status sensors 54 and the microprocessor, maintains −48 volts D.C. on the tip and ring leads when the trunk is idle and grounds the ring lead in response to the sensors 54 detecting a seized trunk condition, and removes the ground from the ring lead in response to the sensors 54 detecting a grounding of the tip lead by the central office, in a well known manner.

Relay contacts K1 and K2 are actuated by a relay coil K1R connected between the source of positive voltage +V and the collector terminal of a transistor Q1. A protective diode $D_p$ is connected across coil K1R in a well known manner. The emitter terminal of transistor Q1 is connected to ground, and the base terminal thereof is connected to the microprocessor, $\mu P$. Current flows through coil K1R to ground through the collector-emitter junction of transistor Q1 in response to transistor Q1 being turned on upon receiving the above mentioned control signal from the microprocessor, $\mu P$.

In operation, the microprocessor, $\mu P$ generates the control signal which causes transistors Q1 and Q2 to turn on resulting in the closure of relay contacts K1 and K2 and the generation of light by light emitting diode 38B. Phototransistor 38A turns on in response to detecting the generated light, thus establishing a circuit path for the extension of operating voltage from the tip and ring leads, T and R, through contacts K1 and K2, the diode bridge, resistor 27 and primary coil 2A to the power supply input of the dual operational amplifier 29A and 29B and the non-inverting input of operational amplifier 29A.

Resistor 27 is provided for effecting a bootstrap process whereby sufficient voltage is extended therethrough and through coil 2A and phototransistor 38A to turn on operational amplifier 29A. The output of amplifier 29A goes high thus generating the above mentioned first enable signal, for turning on transistor 36 which causes current to be drawn from the base of transistor 28 toward the circuit common through the collector-emitter junction of transistor 36, and resistor 37. The base-emitter junction of transistor 28 is thus forward biased and turns on.

Power is thus applied simultaneously to amplifiers 29A and 29B of the dual operational amplifier. In the event amplifiers 29A and 29B are not fabricated as a dual operational amplifier, their power input terminals should be connected in parallel. When transistor 28 begins to turn on, the voltage at its collector rises toward the potential on the tip lead, providing the second enable signal which is applied to the non-inverting input of amplifier 29B through resistor 30. The output of amplifier 29B goes high in response to reception of the enable signal, and Darlington transistor pair 25 and 26 turns on in response thereto.

The ratio of resistance of resistor 30 to 31 provides a bias voltage level for amplifier 29B corresponding to the minimum expected trunk power supply voltage.

In the event the control signal is no longer applied, transistor 28 shuts off but Darlington transistor pair 25 and 26 conducts current for a predetermined amount of time after transistor 28 turns off, due to the fall time of the second enable signal, such that the comparatively high powered Darlington transistor pair breaks the D.C. current path instead of the relatively low powered transistor 28. The rise and fall times are dependent upon the time constant given by the RC product of capacitor 34 and the input resistance due to the combination of resistors 35 and 33 in conjunction with Darlington transistor pair 25 and 26.

The D.C. current flowing between the tip and ring terminals, T and R, through Darlington pair 25 and 26 is determined by the resistance of resistors 30, 31 and 35 when the Darlington transistor pair 25 and 26 is fully conducting. A typical value for the D.C. current flowing between the tip and ring terminals is 100 mA. In a successful embodiment of the invention, the D.C. current path through Darlington transistor pair 25 and 26 and resistor 35 exhibited a D.C. resistance of approximately 210 ohms with resistors 30 and 35 chosen to be 2 megohms and 10 ohms respectively, and resistors 31 and 33 chosen to be 100 k ohms each. The impedance to A.C. signals at 1KHz for the D.C. current path with the above mentioned resistive component values was approximately 38K ohms, wherein capacitor 32 was chosen to be about 0.3 microfarads and capacitor 34 was 3.3 nanofarads. Resistors 30 and 31 were chosen to be large so as to draw little current.

Dial pulse signals may be generated by the trunk circuit and applied to the tip and ring leads, T and R, in response to the control signal from the microprocessor being pulsed (at typically 10 Hz). Direct current flows between the tip and ring leads of the trunk through the Darlington pair of transistors 25 and 26 and resistor 35 in response to logic high portions of the pulsed control signal, and no current flows therethrough in response to logic low portions thereof since, during the low portions, Darlington transistor pair 25 and 26 is biased off. The central office thus detects a low resistance path between the tip and ring leads, T and R, during logic high portions and an open circuit or high resistance path during logic low portions of the pulsed control signal. The central office interprets the approximately 10 hertz dial pulse signal in a well known manner.

As described above, two circuit paths are established in the trunk circuit; the first having a low resistance to D.C. current and a high impedance to A.C. signal current, through which direct current is passed, and the second having an impedance to A.C. signals which matches the nominal line impedance and a high resistance to D.C., through which A.C. signal current is passed.

Considering the second circuit path, through transistor 28, primary coil 2A and capacitor 3, direct current is blocked by capacitor 3 while A.C. signal current passes between the tip and ring terminals, T and R. Actually, a small amount of direct current flows through primary coil 2A in order to supply operating power to the operational amplifiers 29A and 29B. In the successful embodiment, this current was approximately 3 mA, which is small in comparison to the amount of current required to saturate the transformer core.

Since very little D.C. current flows through the primary coil 2A of transformer 2, due to the presence of capacitor 3, there is very little D.C. current tending to saturate the core. Consequently, an inexpensive small core transformer can be used.

In the successful embodiment of the invention, transformer 2 was chosen to be a small core 1:1 transformer having equivalent primary and secondary resistances of approximately 50 ohms, and resistor 50 was chosen to be approximately 500 ohms. Hence, resistors 50 in combination with transformer 2, establishes an A.C. termination impedance equal to approximately 600 ohms for the above mentioned values, thereby matching the nominal A.C. line impedance.

A differential A.C. signal voltage received from the tip and ring terminals, T and R, is applied to primary coil 2A and is coupled to secondary coil 2B. The signal voltage (with respect to ground), is applied to the non-inverting input of buffer amplifier 6. The applied signal is amplified therein and applied to the unbalanced input terminal $V_i$, connected to the PABX. The gain of buffer amplifier 6 is preferably chosen such that the amplitude of the signal therefrom matches the input voltage sensitivity of the PABX.

An unbalanced output signal from the PABX appearing on the output terminal $V_o$, is applied to the non-inverting input of buffer amplifier 4, amplified therein and applied to the secondary coil 2B of transformer 2 through A.C. coupling capacitor 52 and resistor 50. As discussed above, capacitor 52 blocks D.C. current from the output of amplifier 4 from flowing through secondary coil 2B to ground.

The circuit comprising amplifiers 4 and 6, resistors 50, 53 and 56 and capacitor 52 provides a balance network for safe-guarding against the signal on terminal $V_o$ being fed back to terminal $V_i$, which could result in a closed loop gain of greater than one and system instability. A fraction of the signal appearing at the output of amplifier 4 is applied to the inverting input of amplifier 6 through resistor 53. An approximately equal amplitude fraction of the signal from amplifier 4 is applied through resistor 50 and capacitor 52 to the non-inverting input of amplifier 6. The signal carried by the output terminal $V_o$ is thus applied equally to the inverting and non-inverting inputs of amplifier 6 and is cancelled therein, so that it does not appear at the input terminal, $V_i$.

An output signal originating from the unbalanced terminal $V_o$ and impressed across secondary coil 2B induces a signal in primary coil 2A of transformer 2. The induced output signal is superimposed on the D.C. potential appearing across the tip and ring terminals, T and R.

An outgoing modulated D.C. signal is thus formed and applied to the tip and ring leads for transmission to the central office or another PABX.

Accordingly, the circuitry so far described has translated signals from the balanced tip and ring terminals, T and R, to the unbalanced input terminal, $V_i$. It has also translated signals from the unbalanced output terminal $V_o$ to the balanced tip and ring terminals, T and R. The circuit has safe-guarded against signals originating from the unbalanced output lead $V_o$, from being fed back to the unbalanced input lead $V_i$.

The low impedance D.C. current path between the tip and ring terminals and the capacitor for blocking direct current from passing through the transformer allows for significant reduction in the size of the transformer over prior art hybrid transformers. The inventive trunk circuit described above is insensitive to common mode A.C. signals on the balanced pair and exhibits good longitudinal balance, providing at least 500 volts of isolation across transformer 2, thereby overcoming the disadvantages of prior art solid state trunk circuits. A bidirectional amplifier, including a four to two wire network (as it is commonly called) is thus obtained. Bulky hybrid transformers are accordingly eliminated and the entire circuit can be constructed on a single printed circuit card.

The circuit also provides an A.C. terminating impedance which matches the nominal balanced line impedance, and a low resistance to direct current which matches the nominal D.C. trunk resistance.

As a variation in the design, the transistors can have different polarities with appropriate D.C. polarity and biasing arrangements, transistor 28 can be connected between capacitor 3 and the ring terminal, etc. Also, a well known junctor terminal can be used instead of the individual input and output terminals $V_i$ and $V_o$.

It may become clear to a person skilled in the art understanding this invention that numerous other embodiments or variations may be made therein while not departing from the sphere and scope of this invention, as defined in the claims appended hereto.

We claim:

1. A trunk circuit for connection to a balanced lead pair characterized by a nominal line impedance and to unbalanced unidirectional input and output leads, comprising:
    (a) means for applying direct current between respective leads of said balanced lead pair,
    (b) a small core transformer for bidirectionally coupling incoming and outgoing A.C. signals between said balanced lead pair and said unbalanced input and output leads respectively,
    (c) means connected to a secondary of said transformer for matching said nominal line impedance,
    (d) means for substantially blocking direct current from passing through said transformer, and
    (e) means for preventing said outgoing signals from being applied to said unbalanced input lead,
whereby said transformer core is protected from saturation and consequently can be made small as a result of said direct current being substantially blocked from passing therethrough.

2. A trunk circuit for connection to a central office through balanced tip and ring leads characterized by a nominal line impedance and to unidirectional unbalanced input and output leads comprising:
    (a) tip and ring terminals for connection to said balanced tip and ring leads, for carrying a modulated D.C. signal comprised of incoming and outgoing A.C. signals superimposed on a D.C. feed current,
    (b) a first circuit path for passing said D.C. current between the tip and ring terminals and substantially impeding said A.C. signals from passing therebetween,
    (c) input and output terminals for connection to said unbalanced input and output leads, for carrying said incoming and outgoing A.C. signals, respectively,
    (d) a small core transformer having a primary coil thereof connected in a circuit to said tip and ring terminals and a secondary coil thereof connected in a circuit to said input and output terminals and ground, for bidirectionally translating said incoming and outgoing A.C. signals between the tip and ring terminals and said input and output terminals respectively,
    (e) means connected to said secondary coil for matching said nominal line impedance,
    (f) means connected to said primary coil for substantially blocking the D.C. feed current from passing therethrough, and
    (g) cancelling means for preventing said outgoing signals carried by said output terminal from being applied to said input terminal,
whereby said transformer core is protected from saturation and consequently can be made small as a result of said direct current being substantially blocked from passing therethrough.

3. A trunk circuit as defined in claim 2, wherein said first circuit path is comprised of a high D.C. current gain amplifier connected to said tip and ring terminals, having a low resistance to said D.C. current and a high impedance to said incoming and outgoing A.C. signals.

4. A trunk circuit as defined in claim 2, further including means for receiving a control signal from an external controller and generating and transmitting dial pulse signals to said tip and ring leads in response thereto.

5. A trunk circuit for connection to a central office via balanced tip and ring leads for carrying A.C. signals superimposed on a D.C. feed current, and to a PABX through unbalanced input and output leads for carrying said A.C. signals, comprising;
    (a) hybrid means, including a small core transformer, for connection in a circuit to said balanced tip and ring leads and said unbalanced input and output leads, for receiving and bidirectionally coupling said A.C. signals between said tip and ring leads and said unbalanced input and output leads,
    (b) switch means for detecting an optical control signal generated by the PABX and connecting said hybrid means to said balanced tip and ring leads in response thereto, and disconnecting said hybrid means from said balanced tip and ring leads in response to absence of detection of said control signal,
    (c) circuit path means, for connection to said balanced tip and ring leads and said switch means, for passing D.C. feed current between said tip and ring leads in response to said switch means detecting said control signal, and for preventing the D.C. feed current from passing between said tip and ring leads in response to absence of detection of said control signal by said switch means, and
    (d) capacitor means, for connection to said transformer and one of said tip and ring leads, for substantially blocking the D.C. feed current from passing therethrough, whereby said transformer core is protected from saturation and thus can be made small as a result of said direct current being blocked from passing therethrough.

6. A trunk circuit as defined in claim 5, wherein said hybrid means is further comprised of:
(a) first amplifier means connected to said transformer and said output lead, for amplifying outgoing ones of said A.C. signals carried by said output lead and applying them to said transformer,
(b) second amplifier means connected to said transformer and said input lead, for amplifying incoming ones of said A.C. signals received by said transformer from said tip and ring leads and applying said incoming signals to said input lead, and
(c) means for preventing said outgoing signals carried by said output lead and amplified by the first amplifier means from being applied to the second amplifier means.

7. A trunk circuit as defined in claim 6, wherein said switch means is further comprised of:
(a) photosensitive circuit means for receiving said optical control signal and generating an enable signal in response thereto, and
(b) a transistor having an enable input for receiving said enable signal and a current conduction circuit connected to the other one of said balanced tip and ring leads and said transformer for establishing an A.C. signal path between said hybrid means and said balanced tip and ring leads in response to said enable signal being received by said enable input.

8. A trunk circuit as defined in claim 7, wherein said circuit path means is comprised of a high D.C. current gain amplifier having a D.C. current conduction circuit connected to said tip and ring leads and an enable input connected in a circuit to said transistor, for passing direct current between said tip and ring leads in response to said transistor receiving said enable signal.

9. A method for bidirectionally translating signals between a balanced lead pair characterized by a nominal line impedance and unbalanced unidirectional input and output leads, via a small core transformer, comprising the steps of:
(a) applying direct current between respective leads of said balanced lead pair,
(b) bidirectionally coupling incoming and outgoing A.C. signals between said balanced lead pair and said unbalanced input and output leads respectively, through the small core transformer,
(c) matching said nominal line impedance via circuitry connected to a secondary coil of said transformer,
(d) substantially blocking direct current from passing through said transformer, and
(e) preventing said outgoing signals from being applied to said unbalanced input lead.

10. A trunk circuit for connection to a central office through balanced tip and ring leads and to unidirectional unbalanced input and output leads comprising:
(a) tip and ring terminals for connection to said balanced tip and ring leads, for carrying a modulated D.C. signal comprised of incoming and outgoing A.C. signals superimposed on a D.C. feed current,
(b) a first circuit path for passing said D.C. current between the tip and ring terminals and substantially impeding said A.C. signals from passing therebetween, wheren said first circuit path is comprised of a high D.C. current gain amplifier connected to said tip and ring terminals, having a low resistance to said D.C. current and a high impedance to said incoming and outgoing A.C. signals,
(c) input and output terminals for connection to said unbalanced input and output leads, for carrying said incoming and outgoing A.C. signals, respectively,
(d) a small core transformer having a primary coil thereof connected in a circuit to said tip and ring terminals and a secondary coil thereof connected in a circuit to said input and output terminals and ground, for bidirectionally translating said incoming and outgoing A.C. signals between the tip and ring terminals and said input and output terminals respectively,
(e) means connected to said primary coil for substantially blocking the D.C. feed current from passing therethrough, and
(f) cancelling means for preventing said outgoing signals carried by said output terminal from being applied to said input terminal, whereby said transformer core is protected from saturation and consequently can be made small as a result of said direct current being substantially blocked from passing therethrough.

11. A trunk circuit as defined in claim 10, wherein said means for substantially blocking the D.C. feed current is comprised of a capacitor connected in series with said primary coil.

12. A trunk circuit as defined in claim 10, further including means for receiving a control signal from an external controller and generating and transmitting dial pulse signals to said tip and ring leads in response thereto.

13. A trunk circuit as defined in claim 11, further including means for receiving a control signal from an external controller and generating and transmitting dial pulse signals to said tip and ring leads in response thereto.

14. A trunk circuit for connection to a central office through balanced tip and ring leads characterized by a nominal line impedance and to unidirectional unbalanced input and output leads comprising:
(a) tip and ring terminals for connection to said balanced tip and ring leads, for carrying a modulated D.C. signal comprised of incoming and outgoing A.C. signals superimposed on a D.C. feed current,
(b) a first circuit path for passing said D.C. current between the tip and ring terminals and substantially impeding said A.C. signals from passing therebetween,
(c) input and output terminals for connection to said unbalanced input and output leads, for carrying said incoming and outgoing A.C. signals, respectively,
(d) a small core transformer having a primary coil thereof connected in a circuit to said tip and ring terminals and a secondary coil thereof connected in a circuit to said input and output terminals and ground, for bidirectionally translating said incoming and outgoing A.C. signals between the tip and ring terminals and said input and output terminals respectively,
(e) means connected to said primary coil for substantially blocking the D.C. feed current from passing therethrough, (f) cancelling means for preventing said outgoing signals carried by said output terminal from being applied to said input terminal, and (g) means for receiving a control signal from an external controller and generating and transmitting dial pulse signals to said tip and ring leads in response thereto, whereby said transformer core is protected from saturation and consequently can be made small as a result of said direct current being substantially blocked from passing therethrough.

* * * * *